Dec. 14, 1965 W. E. STEVENS 3,223,439
PIPE JOINT
Filed Aug. 3, 1962
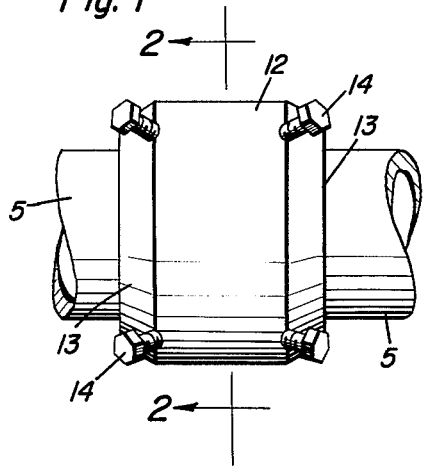
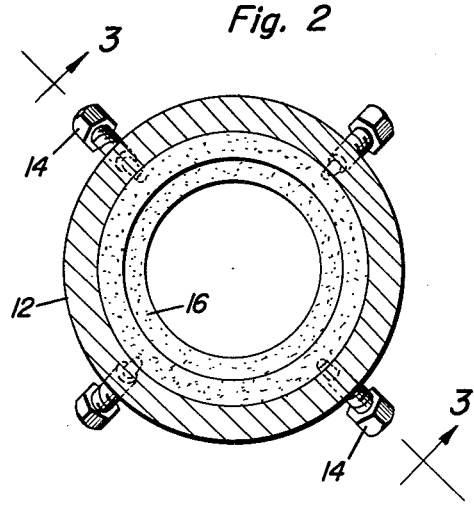
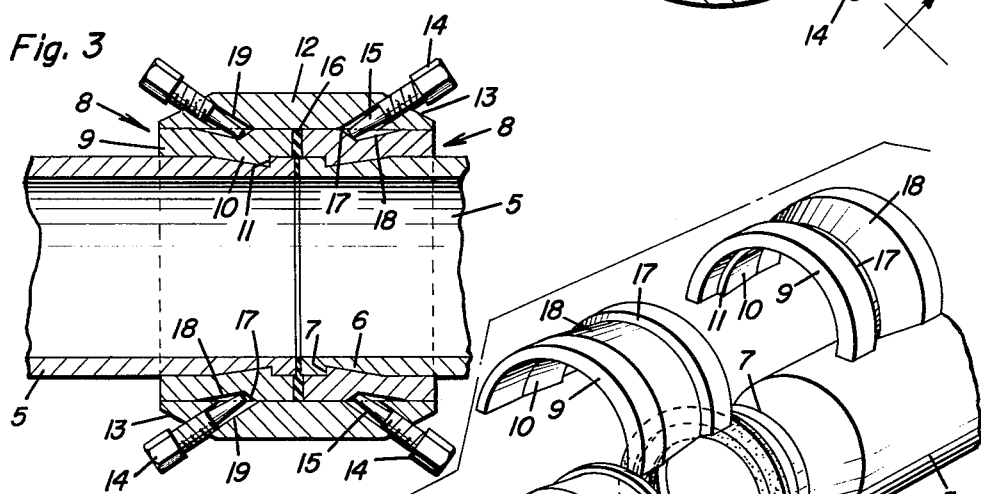
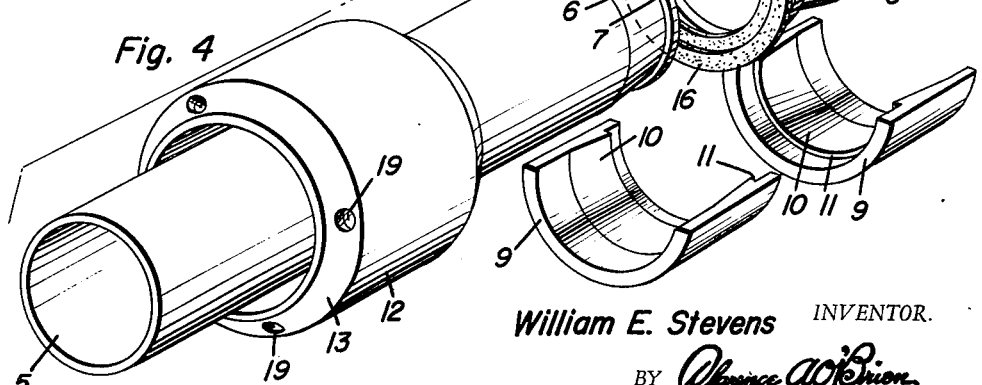
William E. Stevens INVENTOR.

United States Patent Office 3,223,439
Patented Dec. 14, 1965

3,223,439
PIPE JOINT
William E. Stevens, Hollywood, Fla. (12 Nelson Court, Woodards View, Shoreham-by-Sea, Sussex, England)
Filed Aug. 3, 1962, Ser. No. 214,556
1 Claim. (Cl. 285—373)

This invention relates to new and useful improvements in pipe joints or couplings particularly but not necessarily, for high pressure pipe lines and has for its primary object to provide, in a manner as hereinafter set forth, a joint which requires no welding and which, furthermore, may be expeditiously assembled with semi-skilled labor, thus obviating the necessity for expensive skilled labor, heavy and costly equipment, etc.

Another important object of the present invention is to provide a weldless pipe joint of the aforementioned character which is leak-proof and bend resistant.

Another object is to provide an improved weldless pipe joint or coupling of the character set forth which may be quickly assembled with a minimum of unskilled or semi-skilled labor with a single tool such as a conventional wrench.

A further object of the present invention is to provide a weldless pipe joint which presents substantially no obstructions to the fluid flowing through the line.

Still another object is to provide a joint of the character described which may be easily disassembled should it be necessary to disconnect the pipes for any reason.

Other objects of the invention are to provide a pipe joint which is comparatively simple in construction, strong, durable, compact, reliable and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in side elevation of a pipe joint embodying the present invention;

FIGURE 2 is a cross-sectional view on an enlarged scale, taken substantially on the line 2—2 of FIGURE 1;

FIGURE 3 is a longitudinal sectional view, taken substantially on the line 3—3 of FIGURE 2; and FIGURE 4 is an exploded perspective view of the invention.

Referring now to the drawing in detail, it will be seen that reference numeral 5 designates a pair of duplicate, aligned, end-opposed pipe sections to be connected. The adjacent end portions of the pipe sections 5 are provided with circumferential grooves or channels 6. The grooves or channels 6 comprise radial inner side walls providing shoulders or abutments 7.

Removably and slidably mounted on the adjacent end portions of the pipe sections 5 are duplicate collars 8 of suitable metal which terminates short of the ends of pipe section 5. The collars 8 comprise complemental half-sections 9 which are adapted to be assembled around the end portions of the pipe sections 5. The collars 8 further comprise internal circumferential ribs or the like 10 which are engageable in the grooves 6 and conform to the shape thereof. Thus, the ribs 10 include radial inner side walls 11 which abut the shoulders 7.

Slidably and removably mounted on the collars 8 is a coupling sleeve 12, also of suitable metal. The sleeve 12 includes externally tapered end portions 13 having threaded therethrough inwardly convergent clamping screws 14. The screws 14 comprise smooth or unthreaded, tapered inner end portions 15 which are engageable with the walls 17 of generally V-shaped circumferential grooves or channels 18 in the collars 8. A sealing gasket 16 of neoprene or other suitable material is interposed between the collars 8 and the pipe sections 5.

It is thought that the invention will be readily understood from a consideration of the foregoing. Briefly, with the component parts assembled substantially as shown to advantage in FIGURE 3 of the drawing, the clamping screws 14 are tightened or threaded inwardly. Thus, the collars 8 and the pipe sections 5 are forced toward each other for compressing the sealing gasket 16 therebetween. Threaded openings 19 in the tapered end portions 13 of the sleeve 12 receive the clamping screws 14. Of course, to disassemble the coupling the foregoing procedure is substantially reversed. To protect against rust and facilitate disassembly the end portions of the coupling sleeve 12 and the screws 14 may have applied thereto a light coating of asphalt or other suitable material. It will be observed that in the embodiment shown, the sealing gasket 16 is generally T-shaped in cross-section.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A pipe joint assembly comprising a pair of pipe sections disposed in an adjacent end-to-end relationship, each of said pipe sections having a tapered annular groove formed in the outer peripheral surface adjacent the end thereof, each groove having one wall tapering radially inwardly toward the adjacent end of said pipe and another wall extending radially outwardly which defines an annular shoulder, a pair of substantially semicircular collars encircling each pipe section and including tapered circumferential ribs on the inner surface thereof shaped complementary to said grooves and defining shoulders for engaging said annular shoulders, each pipe collar having a radial face disposed axially of its corresponding shoulder and terminating short of the adjacent end of its respective pipe sections when said shoulder is seated in its complementary groove, a sleeve having a cylindrical inner surface closely embracing but freely slidable and rotatable on said collars for enabling free longitudinal movement of the sleeve in overlying relation to the collars, a V-shaped peripheral groove defined in the outer surface of each collar, independently operable screw means disposed at an acute angle to the axis of said sleeve with the axes of said screw means intersecting a plane disposed perpendicular to the axis of the pipe sections and passing between the adjacent end faces of the pipe sections and said collars, the radial limits of said plane being defined by the inner periphery of the pipe sections and the outer periphery of said collars, said screw means engaging each collar within said peripheral groove of each collar for forcing the collars axially toward each other and thereby urging the pipe sections toward each other, an annular sealing gasket of substantially T-shaped cross-section disposed between said pipe sections and said collars, the radial face of each of said collars terminating against the axially extending portion of said T-shaped gasket, and the adjacent ends of said pipe sections engaging a radial leg of said T-shaped gasket, the ribs, shoulders and screw means being so related that upon tightening of said screw means, the collars and pipe sections are urged axially into sealing contact with said gasket.

References Cited by the Examiner

UNITED STATES PATENTS

| | | | |
|---|---|---|---|
| 459,907 | 9/1891 | Hogan | 285—415 |
| 1,242,568 | 10/1917 | Loughridge | 285—414 |
| 1,600,561 | 9/1926 | O'Connor | 285—404 |
| 2,067,271 | 1/1937 | Johnson | 287—111 |
| 2,081,021 | 5/1937 | Smith | 285—415 |
| 2,146,100 | 2/1939 | Walch | 285—404 |
| 2,374,574 | 4/1945 | Adams | 285—368 |
| 2,761,702 | 9/1956 | Noel | 285—355 |

FOREIGN PATENTS

| | | |
|---|---|---|
| 960,592 | 10/1949 | France. |
| 433,917 | 8/1935 | Great Britain. |

CARL W. TOMLIN, *Primary Examiner.*